United States Patent
Achiwa et al.

(10) Patent No.: US 8,466,921 B2
(45) Date of Patent: Jun. 18, 2013

(54) IMAGE PROCESSING APPARATUS AND METHOD FOR LOAD BALANCING OF PLURAL TYPES OF IMAGE PROCESSING IN PLURAL PROCESSORS

(75) Inventors: Ken Achiwa, Kawasaki (JP); Tomohiro Tachikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1212 days.

(21) Appl. No.: 12/104,177

(22) Filed: Apr. 16, 2008

(65) Prior Publication Data

US 2008/0270753 A1 Oct. 30, 2008

(30) Foreign Application Priority Data

Apr. 26, 2007 (JP) ................................. 2007-117560

(51) Int. Cl.
*G06F 15/16* (2006.01)
(52) U.S. Cl.
USPC ........................................................ 345/502
(58) Field of Classification Search
USPC ........................................................ 345/502
See application file for complete search history.

(56) References Cited

U.S. PATENT DOCUMENTS

| | | | | |
|---|---|---|---|---|
| 4,245,306 A | * | 1/1981 | Besemer et al. | 709/245 |
| 5,113,494 A | * | 5/1992 | Menendez et al. | 345/502 |
| 5,327,570 A | * | 7/1994 | Foster et al. | 712/30 |
| 5,500,939 A | * | 3/1996 | Kurihara | 345/537 |
| 5,870,604 A | * | 2/1999 | Yamagishi | 718/105 |
| 7,196,710 B1 | * | 3/2007 | Fouladi et al. | 345/553 |
| 2008/0055621 A1 | * | 3/2008 | Price et al. | 358/1.13 |

FOREIGN PATENT DOCUMENTS

| | | |
|---|---|---|
| JP | 2000-353152 | 12/2000 |
| JP | 2006-133839 | 5/2006 |

* cited by examiner

*Primary Examiner* — Edward Martello
(74) *Attorney, Agent, or Firm* — Cowan, Liebowitz & Latman, P.C.

(57) ABSTRACT

In a case that a first processor assists a second processor, the first processor issues a request for execution of a type of image processing assigned to the second processor, receives information specifying data on which the first processor performs the type of image processing assigned to the second processor, and performs the type image processing assigned to the second processor on the data specified by the information. According to this, it is possible to execute auxiliary processing by a light-loaded processor for a heavy-loaded processor in correspondence with loads of plural processors.

13 Claims, 14 Drawing Sheets

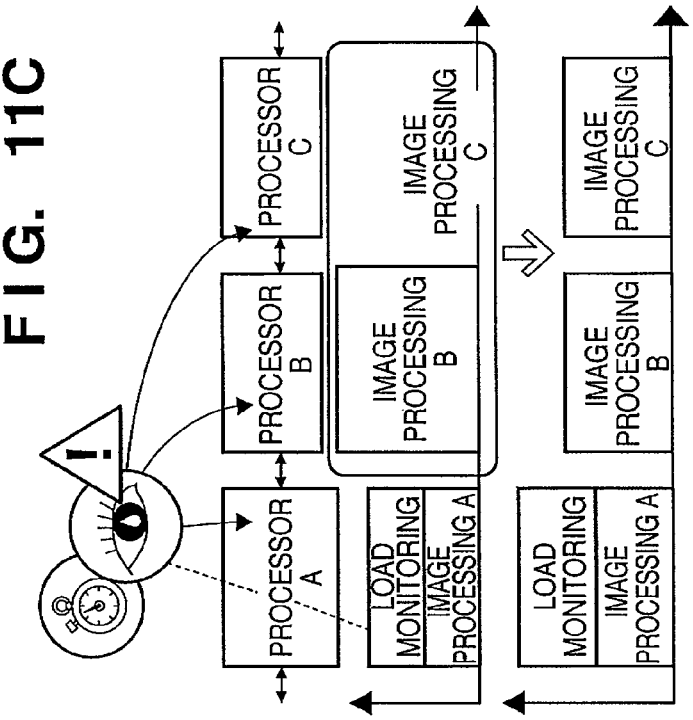
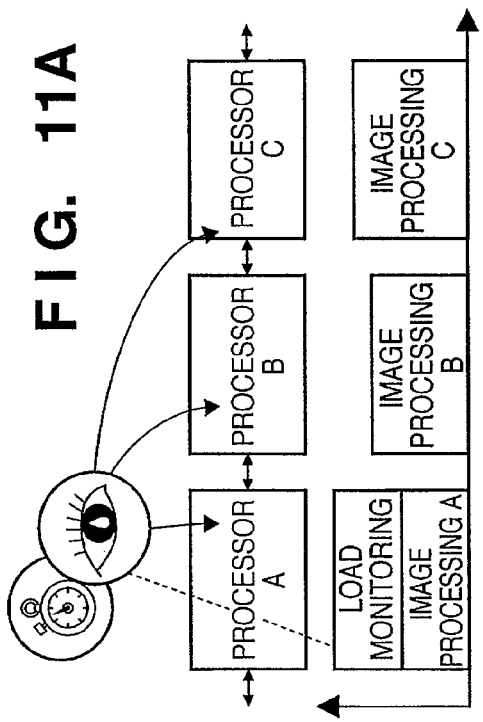
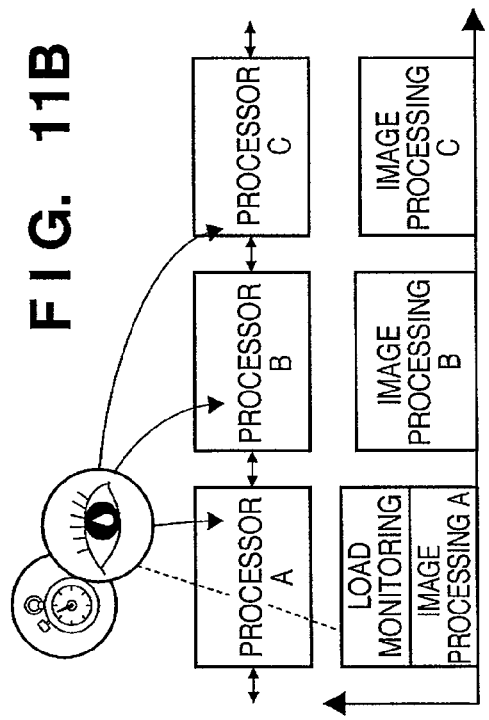

(THRESHOLD VALUE FOR DETECTION OF DATA SHORTAGE IN QUEUE)

IMAGE PROCESSING APPARATUS AND METHOD FOR LOAD BALANCING OF PLURAL TYPES OF IMAGE PROCESSING IN PLURAL PROCESSORS

BACKGROUND OF THE INVENTION

1. Field of the Invention

The present invention relates to image processing apparatus and method thereof to perform plural types of image processings using plural processors on supplied data.

2. Description of the Related Art

An image processing apparatus such as a printer which inputs PDL data in which data is described in Page Description Language (PDL) and generates a raster image based on the PDL data is known. This image processing apparatus conducts two procedures of interpretation of input PDL data and rendering processing. As representative algorithm in this rendering processing, painter's algorithm, scan-line algorithm and the like are known. In the conventional image processing apparatus, the rendering processing is performed with hardware or software using such algorithm. In recent years, an idea of realizing the rendering processing in an image processing apparatus with a software device having plural processors is proposed.

When a raster image is generated by rendering-processing PDL data, processings of edge detection, overlap determination, coloring and the like with respect to a PDL-described object are required. Accordingly, this apparatus has an edge detection PDL command processing section to track edges of a PDL-described image and a level determination PDL command processing section to determine an overlap portion between objects outputted from the edge detection PDL command processing section and determine a visible object. Further, the apparatus has a color creation PDL command processing section to receive a start signal from the level determination PDL command processing section and start color creation and an image data PDL command processing section to process image data, and further, realizes PDL processing by a color composition PDL command processing section.

When the PDL processing is performed with plural processors, the process load on a processor to perform the edge detection PDL command processing may be heavy while that on a processing to perform the color composition PDL command processing may be light in accordance with content of PDL data. In this manner, the process load differs among the processors to perform the respective processings.

The difference in the process load on the processors to perform the respective processings is not limited to the PDL processing, but it generally occurs in a series of image processings for conversion of print data into a raster image using plural processors. Thus, an image processing apparatus in which load balancing in image processing is realized among plural processors is proposed.

Japanese Patent Laid-Open No. 2000-353152 (document 1) discloses a graphic processor having a pipeline structure, in which plural processors are serially connected, and a predetermined processor performs a geometrical operation. The load of a predetermined processor is determined, and if it is determined that the load of the processor is highly loaded, a processor which does not perform the geometrical operation under normal conditions performs a part of the geometrical operation performed by the predetermined processor.

Further, Japanese Patent Laid-Open No. 2006-133839 (document 2) discloses an image processing apparatus which sequentially performs plural types of image processings with plural processors. Each processor has a dedicated instruction operation section in addition to a general instruction operation section. Upon normal processing, a first program described in general instructions and dedicated instructions is executed. Upon auxiliary processing determined based on load balance, a second program described in general instructions is executed.

However, in these documents 1 and 2, one of the plural processors periodically monitors and estimates the load on all the processors and executes a task to correct the load balance. In addition, in a case that the total number of processors is increased for improvement in performance of the entire system, the process load of the task for load balancing is also increased. That is, in a case that the load monitoring and the task to correct the load balance are added to the image processing apparatus, the throughput of the entire system in the image processing apparatus having plural processors is degraded.

SUMMARY OF THE INVENTION

An aspect of the present invention is to eliminate the above-mentioned conventional problems.

According to an aspect of the present invention, it is possible to provide an image processing apparatus and its method to enable execution of auxiliary processing by a light-loaded processor for a heavy-loaded processor in correspondence with loads of plural processors.

According to a first aspect of the present invention, there is provided an image processing apparatus having plural processors for continuously performing plural types of image processings on image data, wherein a first processor included in the plural processors comprising:

a determination unit configured to detect a storage state of a first data storage unit to supply data to be processed to the first processor and that of a second data storage unit to store data processed by the first processor and determine whether or not the first processor is in a waiting state;

a mode switching unit configured to switch an operation mode of the first processor between a normal mode to perform a type of image processing assigned to the first processor and an auxiliary mode to perform a part of a type of image processing assigned to a processor other than the first processor, in accordance with the result of determination by the determination unit; and a process request unit configured to, in a case that the operation mode of the first processor is switched by the mode switching unit to the auxiliary mode to assist a second processor included in the plural processors, issue a request for execution of a part of a type of image processing assigned to the second processor to the second processor, and wherein the second processor comprising:

a notification unit configured to, in response to the request from the first processor by the process request unit, notify information to cause the first processor to perform the part of the type of image processing assigned to the second processor to the first processor, further wherein the first processor performs the part of the type of image processing assigned to the second processor in accordance with the information notified by the notification unit.

According to a second aspect of the present invention, there is provided an image processing method for an image processing apparatus having plural processors for continuously performing plural types of image processings on image data, comprising:

a determination step of detecting a storage state of a first data storage unit to supply data to be processed to a first processor included in the plural processors and that of a second data storage unit to store processed data from the first processor and determining whether or not the first processor is in a waiting state;

a mode switching step of switching an operation mode of the first processor between a normal mode to perform a type of image processing assigned to the first processor and an auxiliary mode to perform a part of a type of image processing assigned to a processor other than the first processor, in accordance with the result of determination in the determination step; and a process request step of, in a case that the operation mode of the first processor is switched in the mode switching step to the auxiliary mode to assist a second processor included in the plural processors, issuing a request for execution of a part of a type of image processing assigned to the second processor to the second processor; and a notification step of, in response to the request, issued in the process request step, from the first processor, notifying information to cause the first processor to perform the part of the type of image processing assigned to the second processor to the first processor, wherein the first processor performs the part of the type of image processing assigned to the second processor in accordance with the information notified in the notification step.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 11A to 11C are conceptual diagrams explaining system process load (load monitoring) in the conventional system;

DESCRIPTION OF THE EMBODIMENTS

Numerous embodiment of the present invention will now herein be described below in detail with reference to the accompanying drawings. The following embodiment is not intended to limit the claims of the present invention.

[RIP Subsystem]

Figure 1:
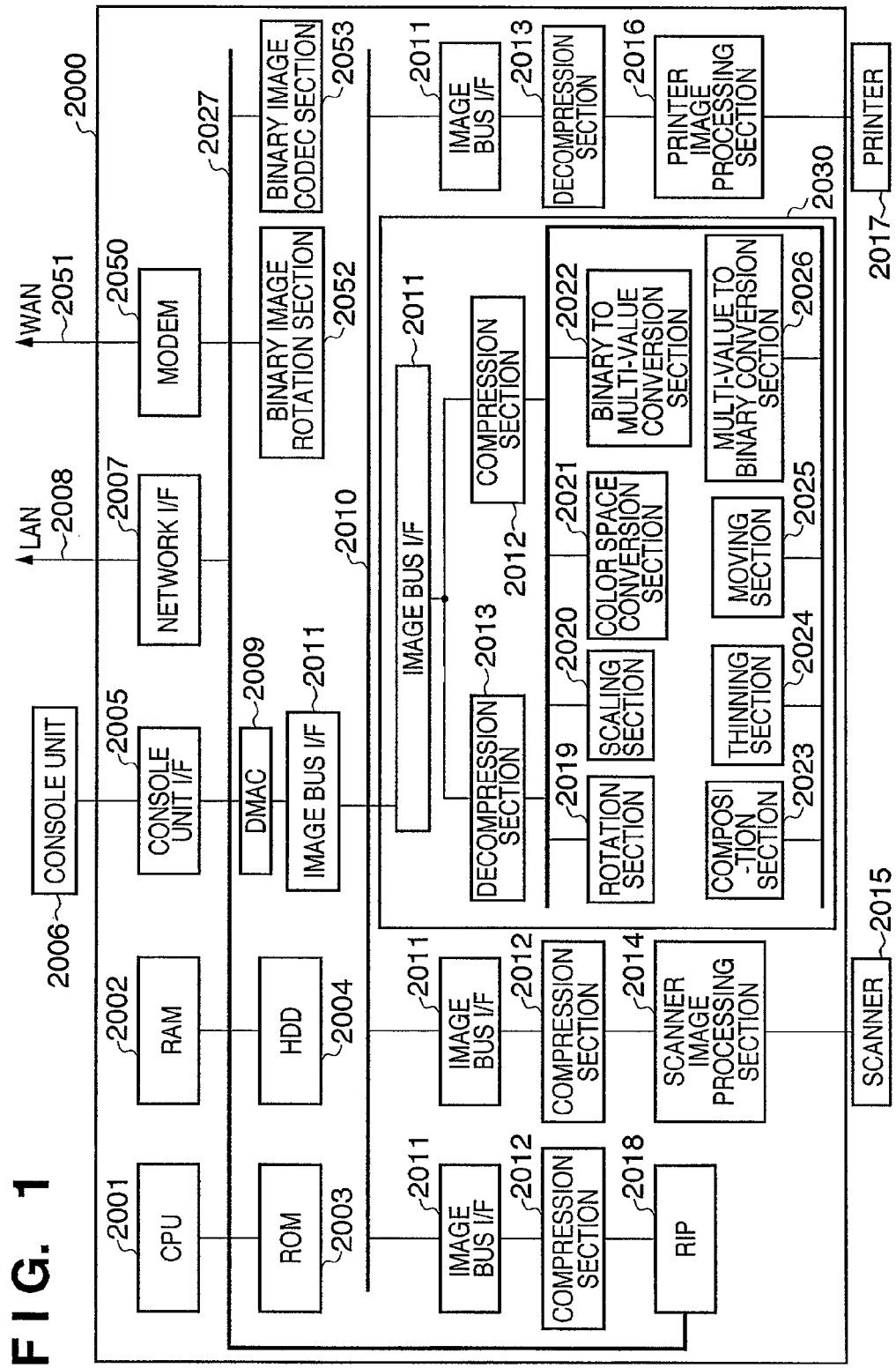
FIG. 1 is a block diagram showing the configuration of a multi function peripheral (MFP) according to an exemplary embodiment of the present invention.

FIG. 1 is a block diagram showing the configuration of a multi function peripheral (MFP) 100 according to an exemplary embodiment of the present invention.

A controller 2000 controls input/output of image information and device information. The controller 2000 is connected to a scanner 2015 as a color image input device and a printer 2017 as a color image output device, and on the other hand, connected to a LAN 2008 and a public line (WAN) 2051. A CPU 2001 controls the entire system. A RAM 2002 is a system work memory for operation of the CPU 201, and is used as an image memory for temporary storage of image data. A ROM 2003 is a boot ROM holding a system boot program. An HDD 2004 is a hard disk drive for storing system software, image data and the like. A console unit I/F 2005 is an interface for a console unit (UI) 2006. The console unit I/F 2005 outputs image data to be displayed on the console unit 2006, to the console unit 2006. Further, the console unit I/F 2005 transmits information inputted with the console unit 2006 to the CPU 2001. A network I/F 2007, connected to the LAN 2008, inputs/outputs information via the LAN 2008. A modem 2050, connected to the public line 2051, inputs/outputs modulated image information. A binary image rotation section 2052 and a binary image codec section 2053 convert the direction of a binary image and/or convert the resolution of the image in correspondence with a predetermined resolution or a resolution of the receiving-side device before the binary image is transmitted via the modem 2050. The compression/decompression in this case supports JBIG, MMR, MR and MH. A DMAC 2009 is a DMA controller which reads image data stored on the RAM 2002 and transfers the read image data to an image bus I/F 2011 without the CPU 2001. Otherwise, the DMAC 2009 inputs image data from an image bus 2010 and written the input image data onto the RAM 2002 without the CPU 2001. These devices are connected to a system bus 2027. The image bus I/F 2011 is an interface for control of high-speed image input/output via the image bus 2010.

A compression section 2012 performs JPEG compression on image data by 32×32 pixels before the image data is transmitted to the image bus 2010. A decompression section 2013 decompresses image data sent via the image bus 2010. A raster image processor (RIP) 2018 receives PDL data from a host computer via the network 2008, and the CPU 2001 stores the PDL data onto the RAM 2002 via the system bus 2027. At this time, the CPU 2001 converts the PDL data into an intermediate code, and inputs the data into the RIP 2018 via the system bus 2027 again, thereby maps the data to a raster image (multivalued). A scanner image processing section 2014 performs various image processings (e.g., correction, process and editing) on color image data and monochrome image data from the scanner 2015, and outputs multivalued data. Similarly, a printer image processing section 2016 performs various image processings (e.g., correction, process and editing) with respect to the printer 2017. Upon printing, as the decompression section 2013 performs conversion from binary data to multivalued data, binary and multivalued data can be outputted.

An image conversion section 2030 has various image conversion functions used when image data on the RAM 2002 is converted and written onto the RAM 2002 again. A rotation section 2019 inputs/outputs binary and multivalued data, and rotates 32×32 pixel image data with a designated angle. A scaling section 2020 has a function of converting the resolution of image data (e.g., from 600 dpi to 200 dpi) and/or scaling (e.g., from 25% to 400%). Before scaling, the scaling section 2020 rearranges 32×32 pixel image data to 32 line image data. A color space conversion section 2021 converts image data inputted as multivalued image data using matrix operation or a LUT, for example, from a YUV image into a Lab image, and stores the image onto the RAM 2002. Further, the color space conversion section 2021 is capable of 3×8 matrix operation, and has a one-dimensional LUT, for well-known underground removal and offset prevention. The converted image data is outputted as a multivalued image data. A binary to multi-value conversion section 2022 converts binary image data to multivalued 8-bit (256 levels) image data. On the other hand, a multi-value to binary conversion section 2026 converts e.g. 8-bit (256 levels) image data on the RAM 2002 to binary image data by error diffusion processing or the like and stores the converted binary image data onto the RAM 2002. A composition section 2023 has a function of combining two multivalued images on the RAM 2002 into one multivalued image. For example, the composition section 2023 combines a company logo image on the RAM 2002 with an original image data, thereby attach the company logo to the original image. A thinning section 2024 performs resolution conversion by thinning pixels from multivalued image data, and outputs ½, ¼, and ⅛ multivalued image data. The enlargement/reduction can be performed on a larger scale by using the thinning section 2024 and the scaling section 2020. A moving section 2025 adds/deletes blank space to/from input binary and multivalued images and outputs the processed images. The rotation section 2019, the scaling section 2020, the color space conversion section 2021, the binary to multi-value conversion section 2022, the composition section 2023, the thinning section 2024, the moving section 2025 and the multi-value to binary conversion section 2026 are capable of operating respectively in combination with each other. For example, in a case that multivalued image data on the RAM 2002 is rotated and resolution-converted, these processings can be performed in combination with each other without using the RAM 2002.

Figure 2:
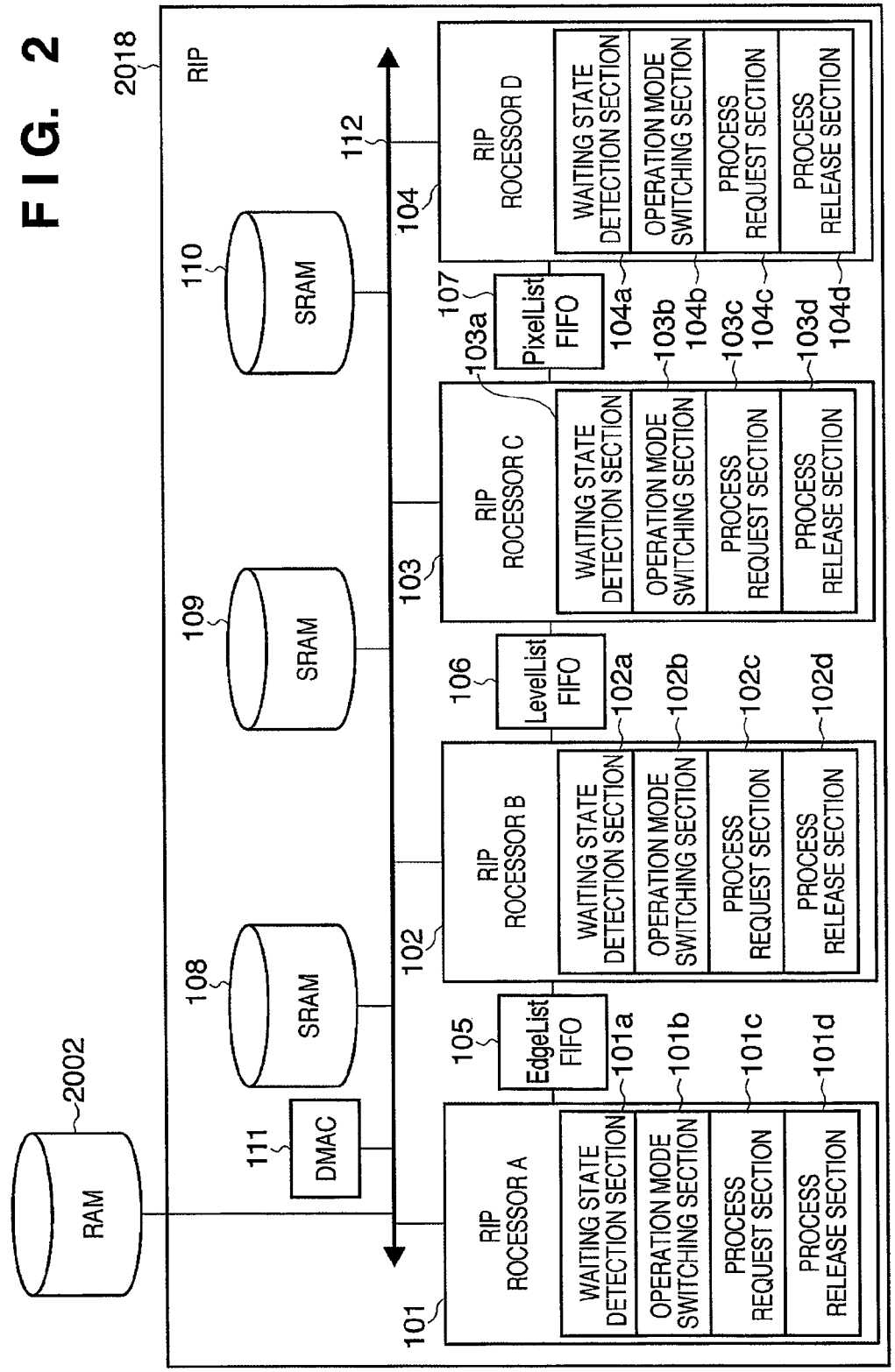
FIG. 2 is a block diagram showing the arrangement of principal parts of a raster image processor (RIP) to perform PDL data processing in the image processing apparatus according to the exemplary embodiment.

FIG. 2 is a block diagram showing the arrangement of principal parts of the raster image processor (RIP) 2018 to perform PDL data processing in an image processing apparatus according to the embodiment.

The raster image processor 2018 has plural RIP processors A to D (101 to 104). The RAM 2002 as a system work memory holds a display list converted based on PDL data.

Hereinbelow the configuration of the RIP 208 will be described.

The RIP processors (PDL command processors) 101 to 104 function as an edge processing section, a level processing section, color generation section and a color composition section. The functions of the respective processors are realized with the respective RIP processors A to D. FIFOs 105 to 107 are buffer memories for delivery of intermediate data such as edge information, level information and pixel information inputted/outputted among the RIP processors A to D. Local memories (SRAMs) 108 to 110 are buffers functions as common memories with which a predetermined one or plural processors among the respective RIP processors A to D can perform reading/writing. A DMAC 111 is a DMA controller which performs data transfer between the RAM 2002 and the SRAMs 108 to 110 in the RIP 2018 without the respective RIP processors A to D.

Hereinbelow, the functions of the RIP processors A to D (101 to 104) will be described.

Numerals 101a to 104a denote waiting state detection sections provided in the respective RIP processors A to D. The waiting state detection sections refer to a data amount in queues for data input/output in preceding and subsequent positions of the respective RIP processors A to D, and determine whether or not the processors 101 to 104 are in a waiting state based on the amount of data, available amount of memory capacity or the like. The determination may be made based on whether or not the data storing state in the respective queues is full or empty. Note that the precedent queue (first data storage) and the subsequent queue (second data storage) may be provided in a storage areas provided in any one of the FIFOs 105 to 107, the SRAMs 108 to 110, and the RAM 2002. The precedent queue supplies data to be processed to the processor, and the subsequent queue holds processed data outputted from the processor. Numerals 101b to 104b denote operation mode switching sections provided in the respective RIP processors A to D. For example, in accordance with the result of determination by the waiting state detection section 104a, the operation mode of the processor D 104 is switched between a normal mode and an auxiliary mode. The normal mode means a mode to perform a type of image processing (color composition processing) assigned to the processor D 104. The auxiliary mode means a mode to perform other types of image processing (e.g. edge processing) assigned to another processor (e.g. the processor A 101) other than the processor D 104. That is, in an image processing apparatus having plural processors, a first processor (e.g. the processor D 104) and a second processor (e.g. the processor A 101), the first processor operates as follows.

First, the first processor performs a type of image processing (e.g. color composition processing) assigned to the first processor as a normal mode. On the other hand, the first processor (e.g. the processor D 104) performs another type of image processing (e.g. edge processing) assigned to the second processor as an auxiliary mode. Numerals 101c to 104c denote process request sections provided in the respective RIP processors A to D. For example, the process request section 104c in the processor D 104 issues a request for information necessary to start a part of processing assigned to the processor A 101, such as process start address, to the processor A 101. Numerals 101d to 104d denote process release sections provided in the respective RIP processors A to D. For example, the process release section 101d in the processor A 101 notifies information necessary to start a part of processing assigned to the processor A 101, such as process start address, to the processor D 104. Note that the detailed operations of these internal functions will be described later using the flowcharts of FIGS. 7 and 8.

[RIP Processor Load State (Conventional Art)]

Figure 3:
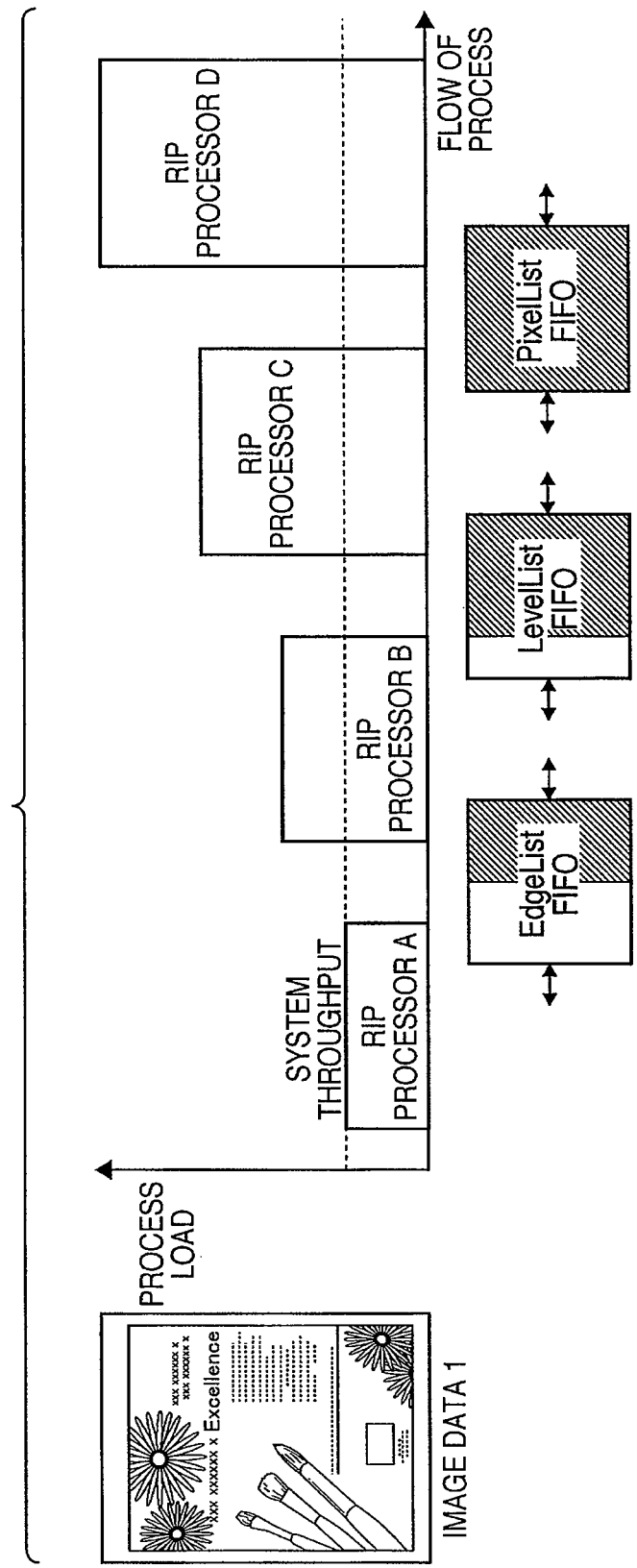
FIGS. 3 and 4 depict explanatory views illustrating, in a conventional image processing system having plural processors, the conception of loads of the respective processors upon execution of image processing on image data.
Figure 4:
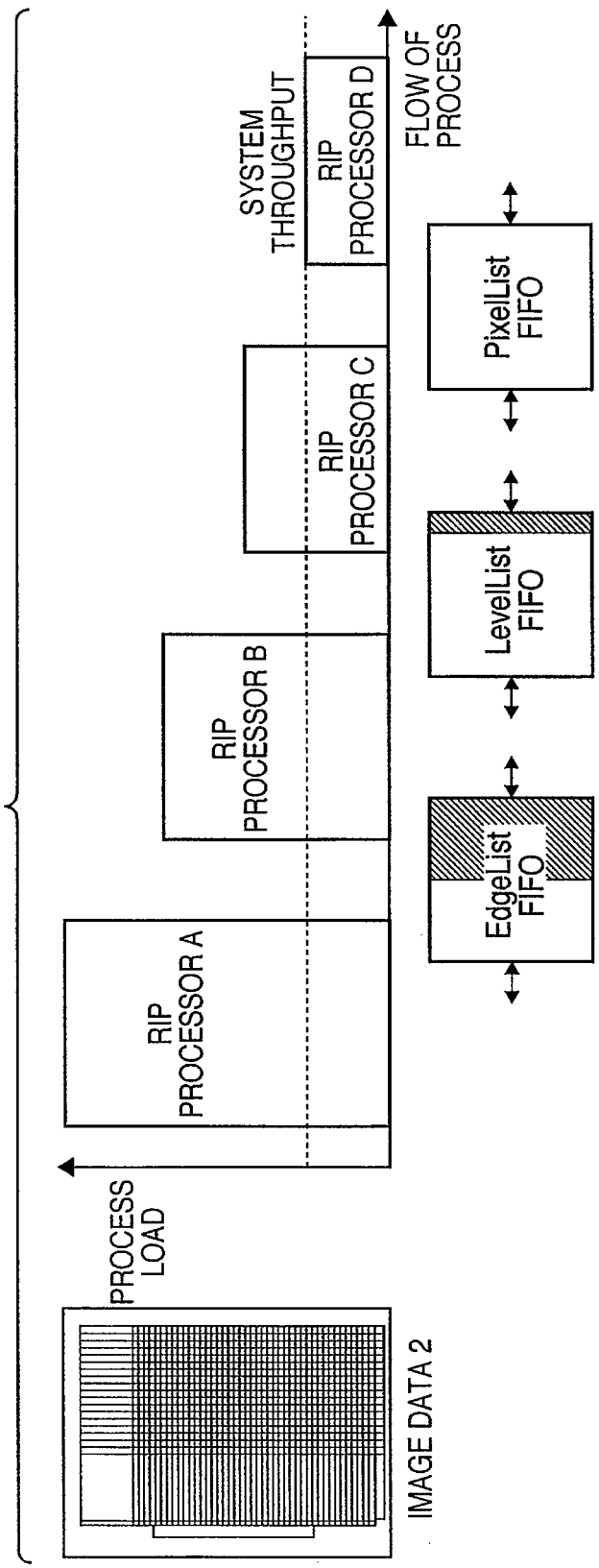

FIGS. 3 and 4 depict explanatory views showing, in a conventional image processing system having plural processors, the conception of loads of the respective processors upon execution of image processing on image data.

FIG. 3 depicts an explanatory view using image data 1 in which an image such as a JPEG photograph image is attached in a wide range in a page. In the image data 1, the one image attached in the wide range within the page exists as one object. Accordingly, the number of object edges existing in the page is small, however, the number of pixels including object overlap portions existing in the page is large. Accordingly, in a case that image processing is performed on the image data 1, the process load on the edge processing section (RIP processor A 101) is light while the process load on the color composition section (RIP processor D 104) is heavy.

FIG. 4 depicts an explanatory view using image data 2 including many vertical and horizontal ruled lines such as spreadsheet data. In the image data 2, edge tracking is performed by scan line with respect to the vertical and horizontal ruled lines. Accordingly, a line in which plural black spans and white spans are alternately generated by partitioning with plural vertical ruled lines, and a line in which a single black span is generated by drawing of single horizontal line, are repeated. That is, the number of object edges existing in the page is large, while the number of pixels including object overlap portions existing in the page is small. Accordingly, in a case that image processing is performed on the image data 2, the process load on the edge processing section (RIP processor A 101) is heavy while the process load on the color composition section (RIP processor D 104) is light.

Hereinbelow, the detailed processing operations of the processors according to the present embodiment will be described on the assumption of processing on the image data 2 shown in FIG. 4.

[RIP Processing (Edge Processing)]

Figure 5:
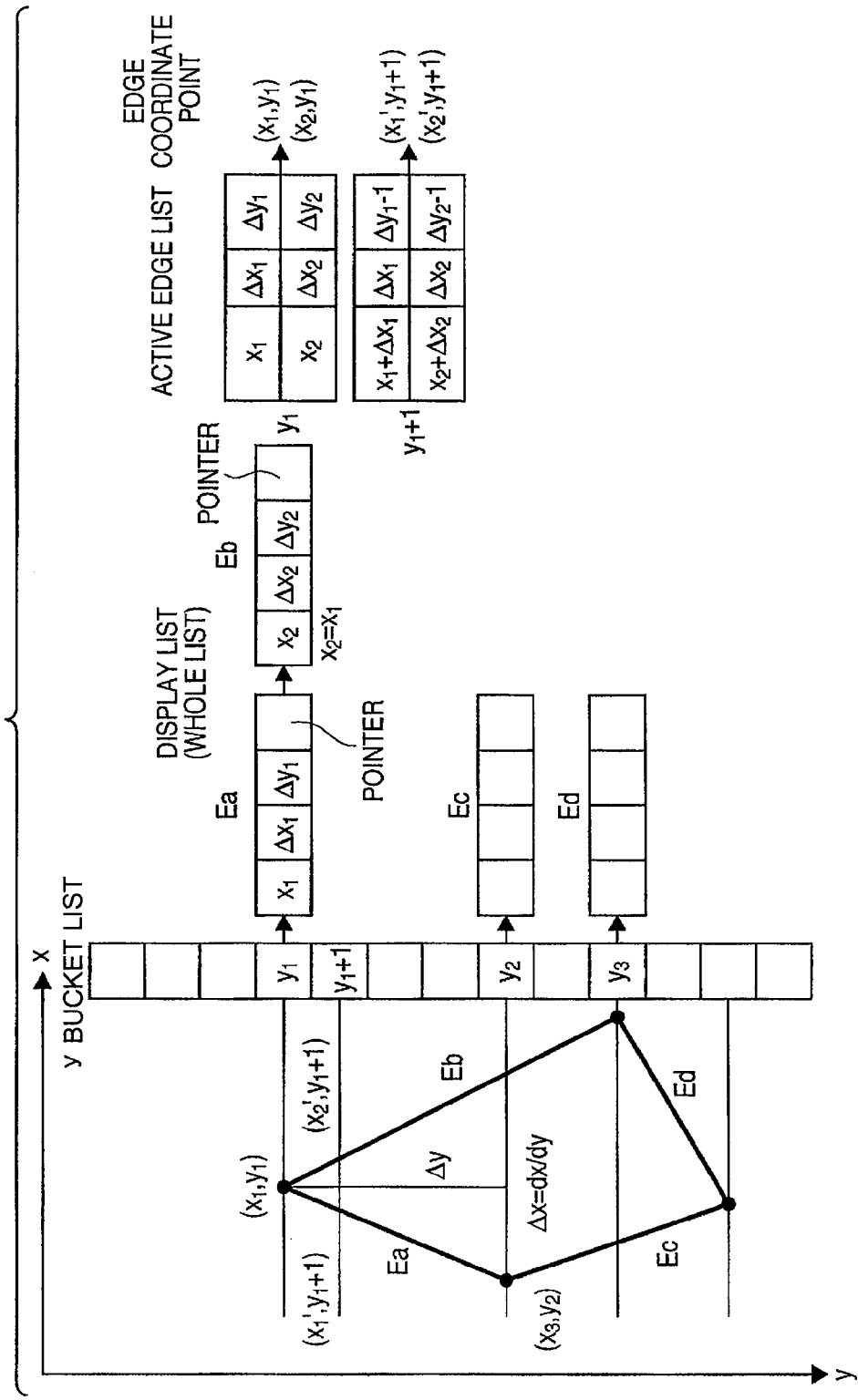
FIG. 5 depicts an explanatory view showing the flow of processing of generation of edge coordinate points for bit-mapping from outline information of an object.

FIG. 5 depicts an explanatory view showing the flow of processing of generation of edge coordinate points for bitmapping from outline information of an object.

In FIG. 5, the outline of a polygon is constituted by four edges, Ea to Ed. These edges Ea to Ed are sorted by y-coordinate value of a smaller-value vertex of each absolute value (hereinbelow, edge start point), and linked in a y-bucket list and stored. For example, in a scan line crossing the start point (x1, y1) of edges Ea and Eb, a cell indicating information on the edge Ea and a cell indicating information on the edge Eb are stored in a y-bucket list corresponding to the y-coordinate value y1 of the start point. Each cell in the y-bucket list includes information for generating an intersection point between a scan line and each edge, that is, an x-coordinate value of an edge start point, an amount of change $\Delta x$ per scan line indicating edge inclination, the number of intersections $\Delta y$ between the edge and scan line and a pointer to the next cell. The entire y-bucket list and the respective cells is referred to as a display list. Next, the display list is converted to information to be simultaneously processed by each scan line. The information is referred to as an active edge list. Then, edge coordinate points are outputted based on the active edge list.

Generally, the generation of edge coordinate points from the display list is referred to as scan line conversion. The edge coordinate points generated by the scan line conversion are sorted in accordance with a coordinate value, then painting is sequentially performed between the sorted coordinate points with predetermined color data, thus bitmap data is generated. The scan line conversion generates coordinate points of the top to the bottom of edges by one scan line. That is, all the edges crossing a current scan line are put on the list, and the coordinate points of the edges are outputted while the active edge list as shown in FIG. 5 is generated. When the current scan line has been processed, the respective records in the active edge list are updated (x=x+$\Delta x$, $\Delta y$=$\Delta y$−1) for the next scanning. The packet where $\Delta y$=0 holds is deleted from the list.

[RIP Processor Operation]

Figure 6:
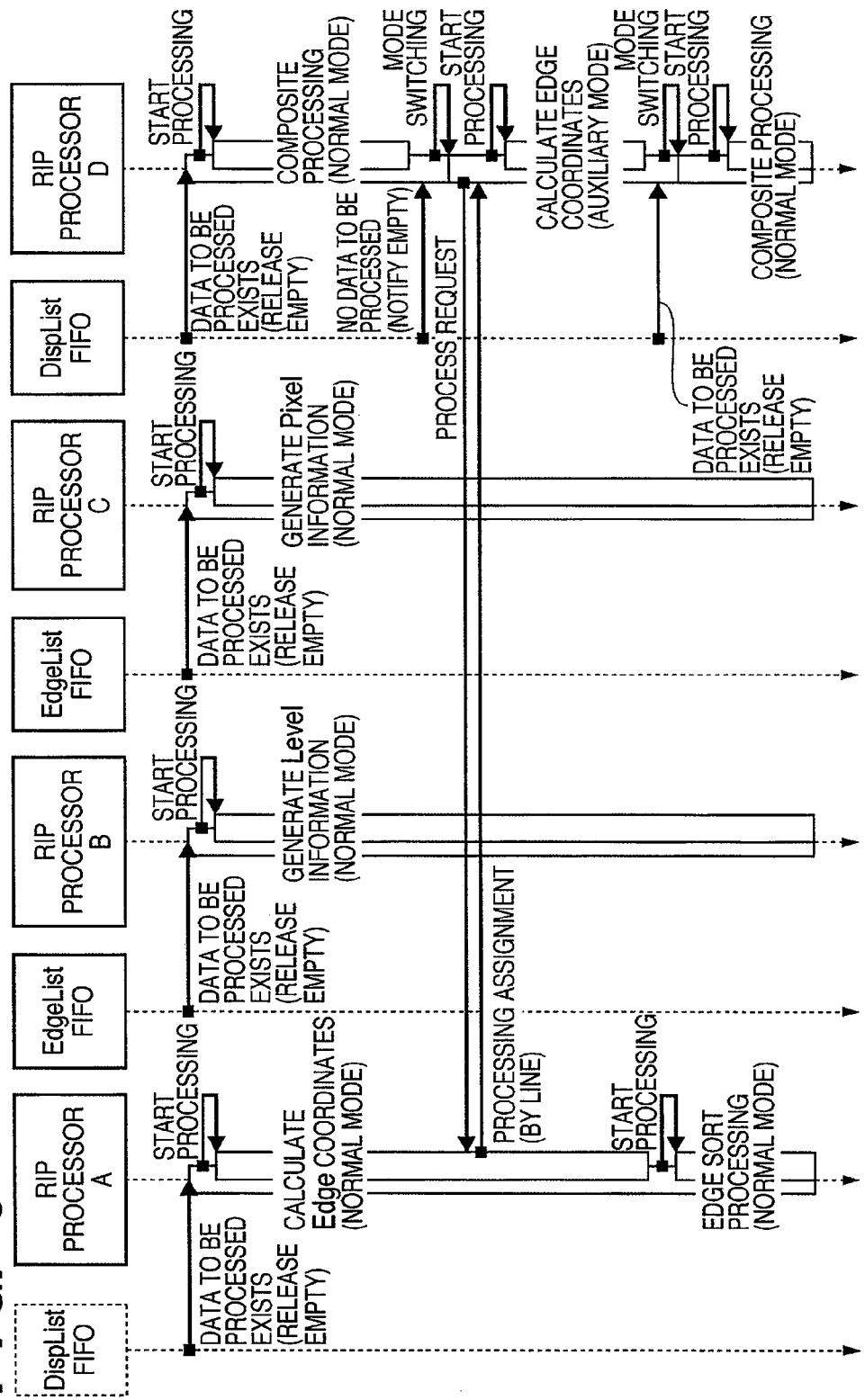
FIG. 6 is a sequence diagram showing an operation example in a case that respective RIP processors A to D are simultaneously caused to operate.

FIG. 6 is a sequence diagram showing an operation example when the respective RIP processors A to D simultaneously operate. In this example, on the assumption of processing on the image data 2 shown in FIG. 4, the RIP processor D 104 in charge of the function of the color composition section becomes into the auxiliary mode to perform a part of the processing by the RIP processor A 101 in charge of the function of the edge processing section, then returns to the normal mode.

Figure 7:
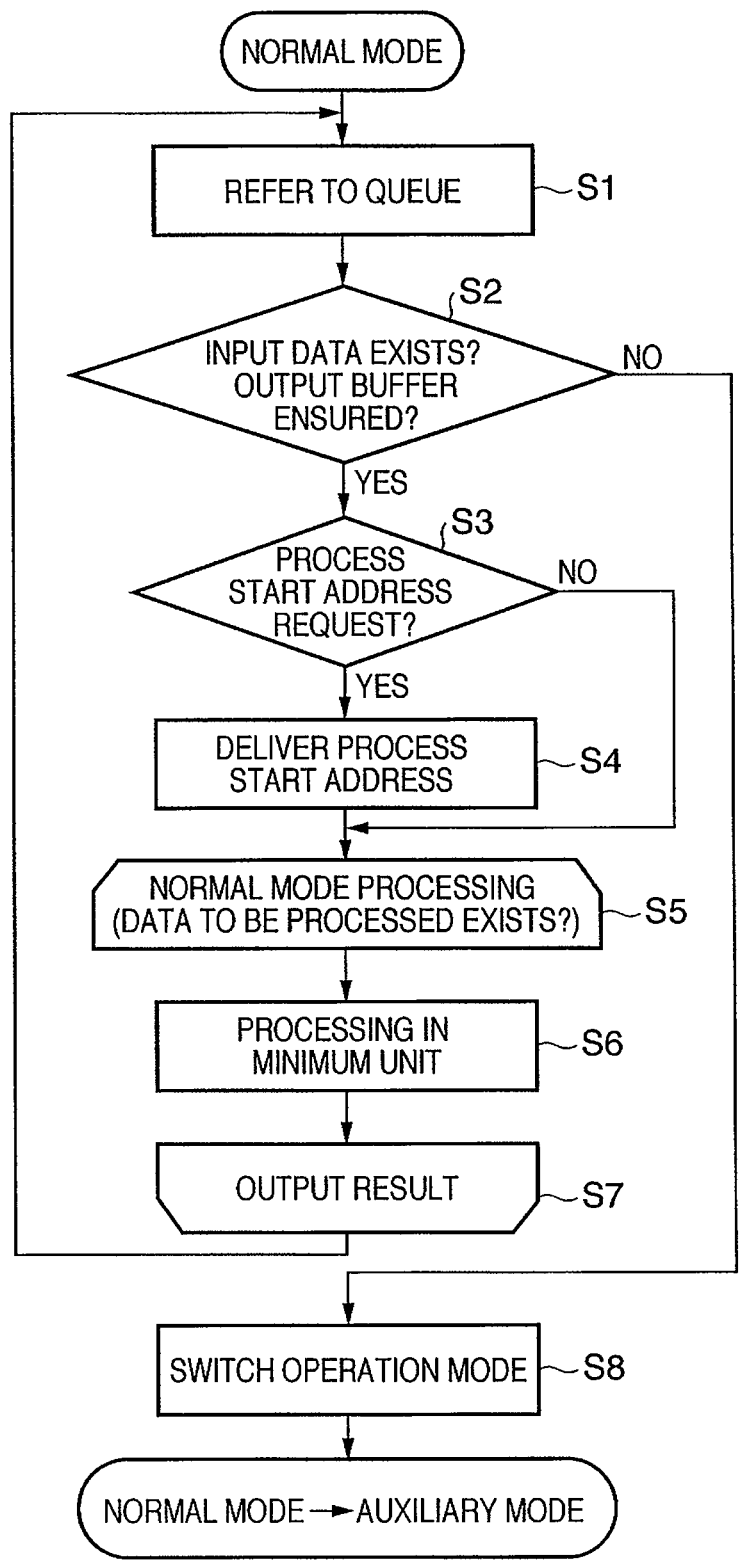
FIG. 7 is a flowchart explaining processing in a case that the RIP processor according to the embodiment operates in a normal operation mode.
Figure 8:
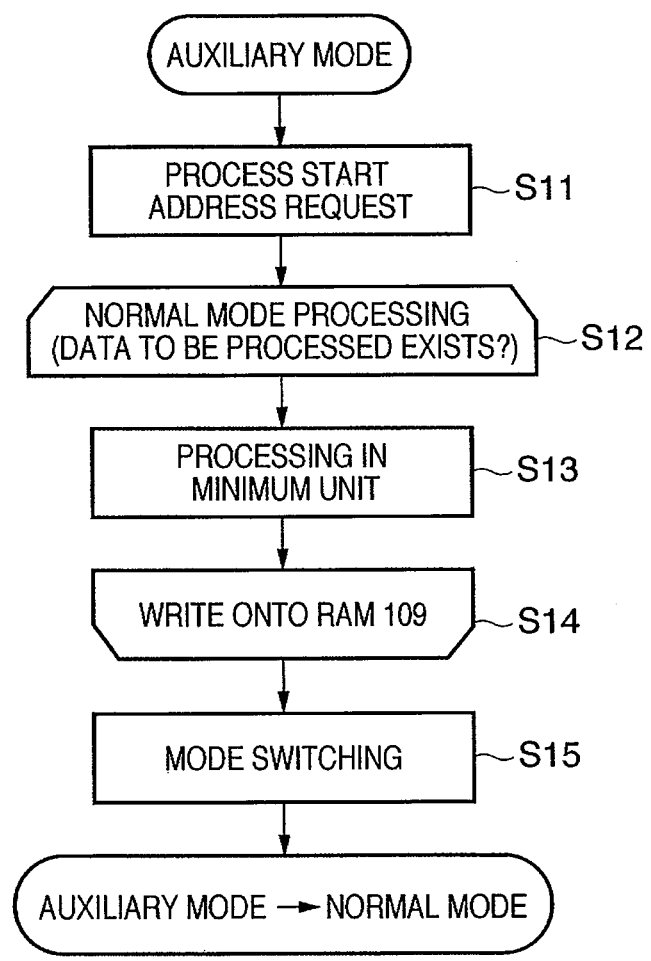
FIG. 8 is a flowchart explaining processing in a case the RIP processor according to the embodiment operates in an auxiliary mode.

Hereinbelow, the operation example in FIG. 6 will be described in accordance with the flowcharts of FIGS. 7 and 8.

[Operation Flow of RIP Processor D]

First, the operation of the RIP processor D 104 in the normal mode will be described in accordance with the flowchart of FIG. 7.

First, in step S1, the RIP processor D 104 refers to data on the FIFO 107 corresponding to the precedent queue of the RIP processor D 104 and the SRAM 110 corresponding to the subsequent queue of the RIP processor D 104. Next, in step S2, the RIP processor D 104 determines whether or not the precedent queue FIFO 107 holds pixel data before color composition by an amount greater than a predetermined threshold value (e.g., pixel data necessary for processing for two lines). At the same time, the RIP processor D 104 determines whether or not the subsequent queue SRAM 110 has an available memory capacity for storage of pixel data after color composition greater than a predetermined threshold value (e.g., pixel data for two lines). If these conditions are satisfied, the process advances to step S3, and otherwise, advances to step S8.

In step S3, the RIP processor D 104 determines whether a request for a start address of processing has been issued from the other RIP processors A to C 101-103 than the RIP processor D 104. If no process start address request has been issued, the process of the RIP processor D 104 advances to step S5, while if the process start address request has been issued, the process proceeds to step S4. In step S4, the RIP processor D 104 receives the requested process start address, and the process of the RIP processor D 104 proceeds to step S5. In step S5, the RIP processor D 104 repeats color composition processing as processing in the normal mode. The color composition processing is performed by one pixel as a minimum processing unit. When the image processing in the minimum unit has been completed, the process of the RIP processor D 104 proceeds to step S7, at which the RIP processor D 104 stores the processed data onto the SRAM 110, and returns to step S1.

If the amount of data held in the precedent queue FIFO 107 is not sufficient in step S2, or there is no sufficient available memory capacity in the SRAM 110, the process of the RIP processor D 104 proceeds to step S8. In step S8, the operation mode of the RIP processor D 104 is switched from the normal mode to the auxiliary mode.

Next, the operation of the RIP processor D 104 in the auxiliary mode will be described in accordance with the flowchart of FIG. 8.

First, in step S11, the RIP processor D 104 issues a request for a start address of processing to start a part of the edge processing to the RIP processor A 101. Next, in step S12, the RIP processor D 104 performs auxiliary mode processing to perform a part of the edge processing assigned to the RIP processor A 101 (e.g., edge processing on a line next to the line being processed by the RIP processor A 101). Then in step S13, in a case that the processing on the data in the minimum unit has been completed, the processing of the RIP processor D 104 proceeds to step S14, at which the RIP processor D 104 writes the result of the processing onto the SRAM 109 commonly read/written by the RIP processor A 101 and the RIP processor D 104, and then the auxiliary mode processing loop of the RIP processor D 104 is ended. Then in step S15, the operation mode of the RIP processor D 104 is switched from the auxiliary mode to the normal mode.

Next, the processing by the RIP processor A 101 will be described.

[Operation Flow of RIP Processor A]

The operation of the RIP processor A 101 that operates in association with the above-described processing by the RIP processor D 104 in the normal mode will be described in accordance with the flowchart of FIG. 7.

First, in step S1, the RIP processor A 101 refers to data on the local memory SRAM 108 corresponding to the precedent queue of the RIP processor A 101 and the FIFO 105 corresponding to the subsequent queue of the RIP processor A 101. Then in step S2, the RIP processor A 101 determines whether or not the SRAM 108 holds display list information before edge processing by an amount greater than a predetermined threshold value (e.g., display list information necessary for processing for two lines). At the same time, the RIP processor A 101 determines whether or not the FIFO 105 has an available memory capacity for storage of edge information after edge processing greater than a predetermined threshold value (e.g., edge list information necessary for processing for two lines). If these conditions are satisfied, the process of the RIP processor A 101 proceeds to step S3, otherwise, proceeds to step S8.

In step S3, the RIP processor A 101 determines whether the request for a start address of process has been issued from the other RIP processors B to D 102-104 than the RIP processor A 101. If the request for the start address has not been issued from the RIP processor D 104, the process of the RIP processor A 101 proceeds to step S5, on the other hand, if the request for the start address has been issued, the process of the RIP processor A 101 proceeds to step S4. In step S4, the RIP processor A 101 notifies a head address of the next 1 line data in the display list information on the SRAM 108 as input data for edge processing, as the start address of the process, to the RIP processor D 104. At this time, the RIP processor A 101 also notifies a head address of an output destination memory after the auxiliary processing to the RIP processor D 104. In step S5, the RIP processor A 101 repeats the edge processing as processing in the normal mode. The edge processing (edge tracking and edge sorting) is performed by one coordinate (1 edge) as a minimum processing unit. In step S6, the processing is performed within a range corresponding to the amount of data ensured in steps S1 and S2 (e.g., edge processing for one line). Then in step S7, the RIP processor A 101 outputs the result of the processing to the subsequent queue FIFO 105, and ends the processing in the normal mode. Thereafter, the process of the RIP processor A 101 returns to step S1.

[RIP Processor Load State]

Figure 9:
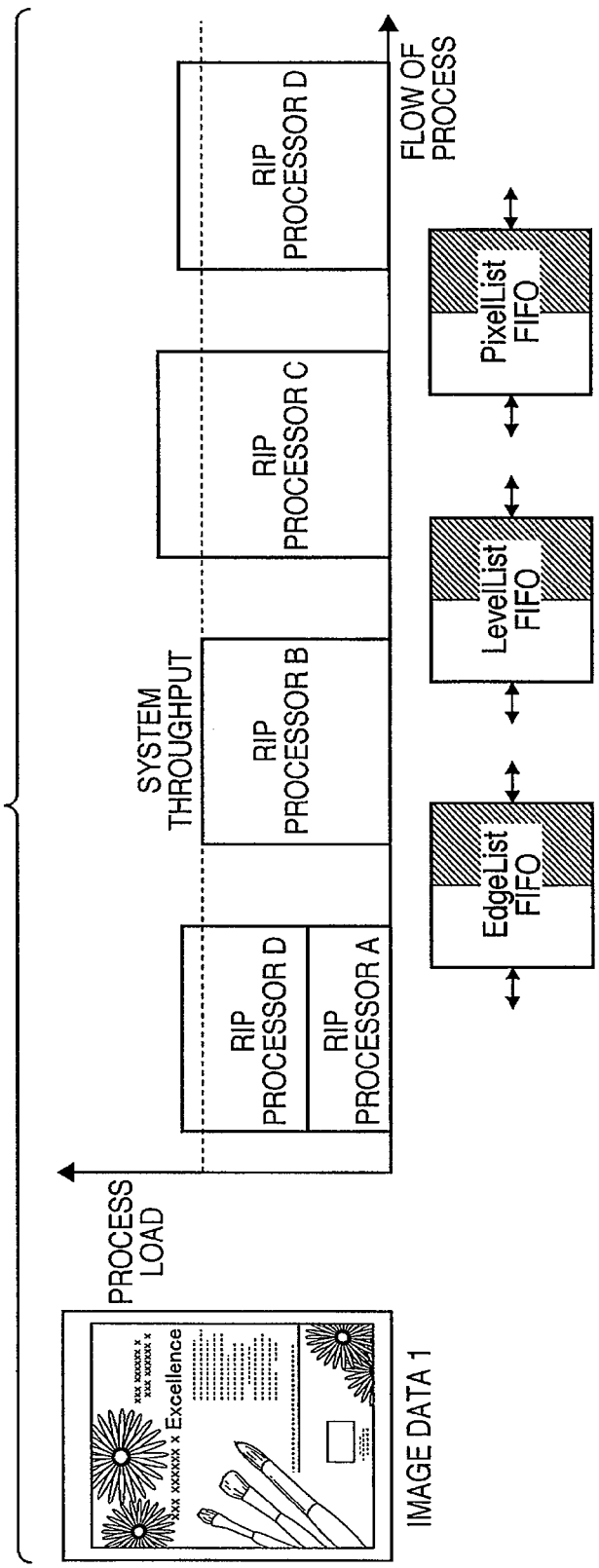
FIGS. 9 and 10 depicts explanatory views respectively showing, in an image processing system having plural processors according to the embodiment, the conception of loads of the respective processors upon execution of image processing on image data.

FIG. 9 depicts an explanatory view showing, in an image processing system having plural processors according to the present embodiment, the conception of loads of the respective processors upon execution of image processing on the image data 1. In this example, the RIP processor A 101 operates in the auxiliary mode for the RIP processor D 104. As it is apparent from a comparison between FIGS. 3 and 9, the RIP processor A 101 which has been in the process waiting state performs a part of the image processing (color composition processing) assigned to the RIP processor D 104, that has been a bottleneck, for the RIP processor D 104. This improves the throughput of the entire system.

Figure 10:
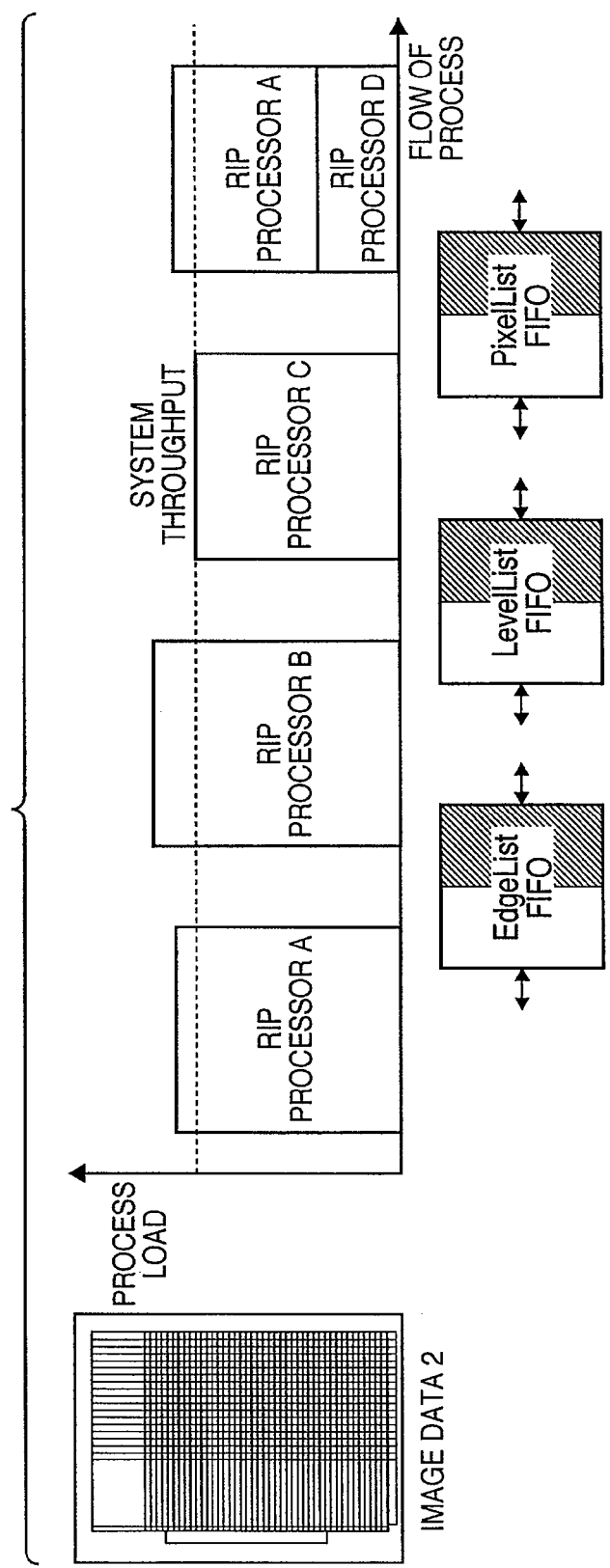

FIG. 10 depicts an explanatory view showing, in the image processing system having plural processors according to the present embodiment, the conception of loads of the respective processors upon execution of image processing on the image data 2. As in the case of FIG. 6, the RIP processor D 104 operates in the auxiliary mode for the RIP processor A 101.

As it is apparent from a comparison between above-described FIG. 4 and FIG. 10, the RIP processor D 104 in a process waiting state performs a part of the processing by the RIP processor A 101, that has been a bottleneck, for the RIP processor A 101, thereby the throughput of the entire system can be improved.

[Processing for Load Balancing of Processors]

Note that in the above embodiment, the RIP processor A 101 is the subject of assistance by the RIP processor D 104 in the auxiliary mode, while the RIP processor D 104 is the subject of assistance by the RIP processor A 101. As shown in FIGS. 3 and 4, among the plural processors 101-104 to perform pipeline processing, bottleneck processing can be approximately determined in accordance with the property of the data. That is, the RIP processor A 101 positioned in the first half of the plural processors to perform the pipeline processing and the RIP processor D 104 positioned in the last half of the plural processors to perform the pipeline processing mutually assist respectively in the process waiting state.

As such operation mode is prepared, the loads of the plural processors can be periodically monitored, and if load off-balance is determined, the load balancing can be performed. Accordingly, preferable load balancing can be performed.

Hereinbelow, the advantage of the load balancing method according to the present embodiment in comparison with the conventional art will be described.

FIGS. 11A to 11C and FIGS. 12A to 12C are conceptual diagrams explaining system process load (load monitoring) in a conventional system and the system according to the present embodiment.

As shown FIGS. 11A and 11B, in the conventional system, a processor A, for example, performs a load monitoring task to periodically monitor the loads of all the processors A to C in addition to the image processing task assigned to the processor A. As a result of the load monitoring, as shown in FIG. 11C, when load off-balance between the processors B and C is determined, queuing of the image processing assigned to the processors B and C is performed. Then, at a particular timing, the processor A performs reassignment of the image processing to the processors B and C.

Figure 12A:
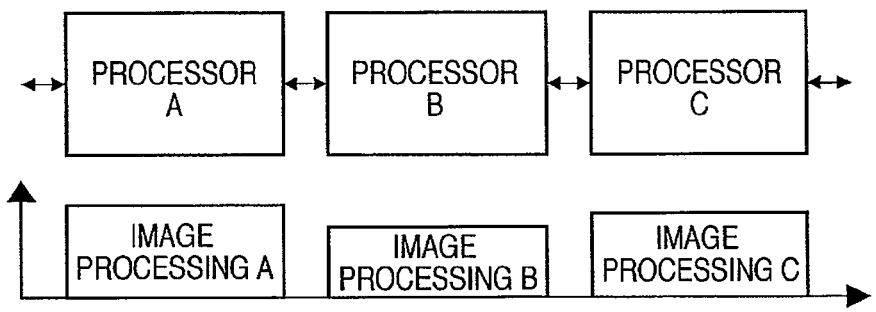
FIGS. 12A to 12C are conceptual diagrams explaining the system process load (load monitoring) in the system according to the embodiment.
Figure 12B:
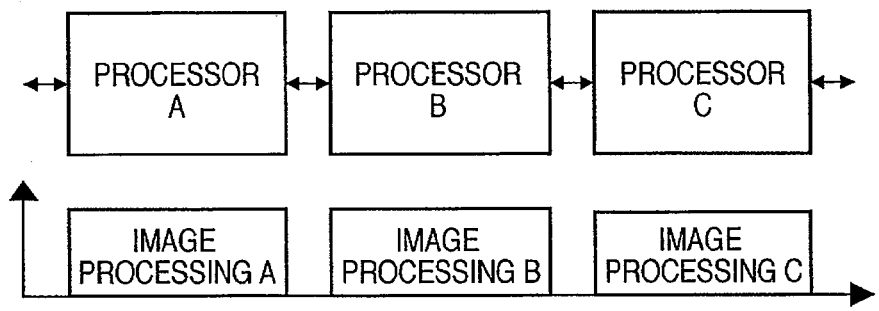
Figure 12C:
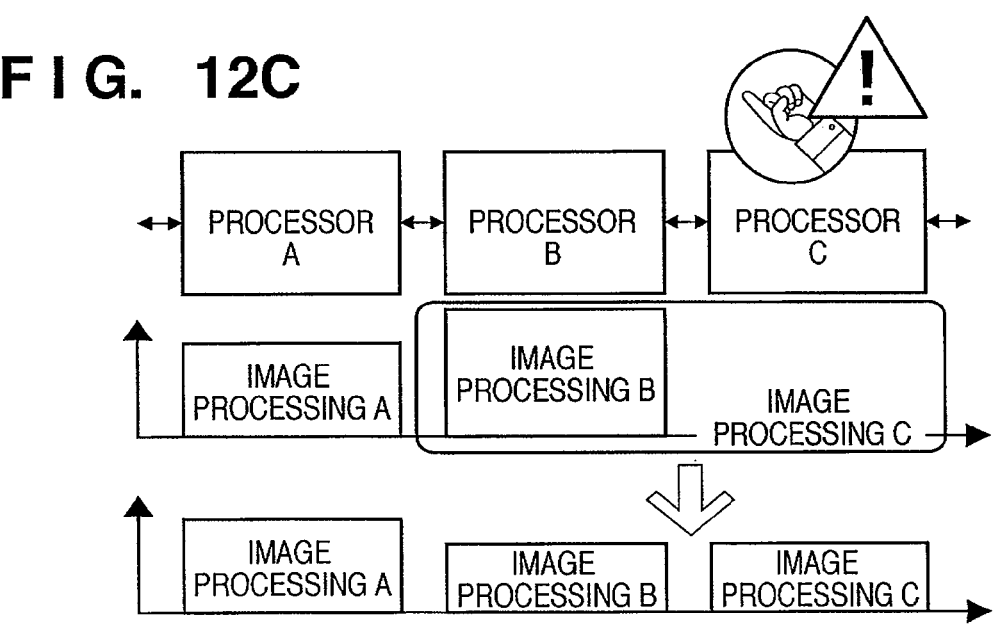

On the other hand, in the present embodiment, as shown in FIGS. 12A and 12B, unless load off-balance is determined, all the processors A to C including the processor A perform image processings assigned to the respective processors, and each processor detects its own waiting state. Then, as shown in FIG. 12C, the processor C, for example, in the process waiting state, utilizes its process waiting time to issue a processing request to the processor B and perform a part of the processing for the processor B.

FIGS. 13A to 13C and FIGS. 14A to 14C are conceptual diagrams showing the system process load (load estimation) in the conventional system and the system according to the present embodiment.

Figure 13A:
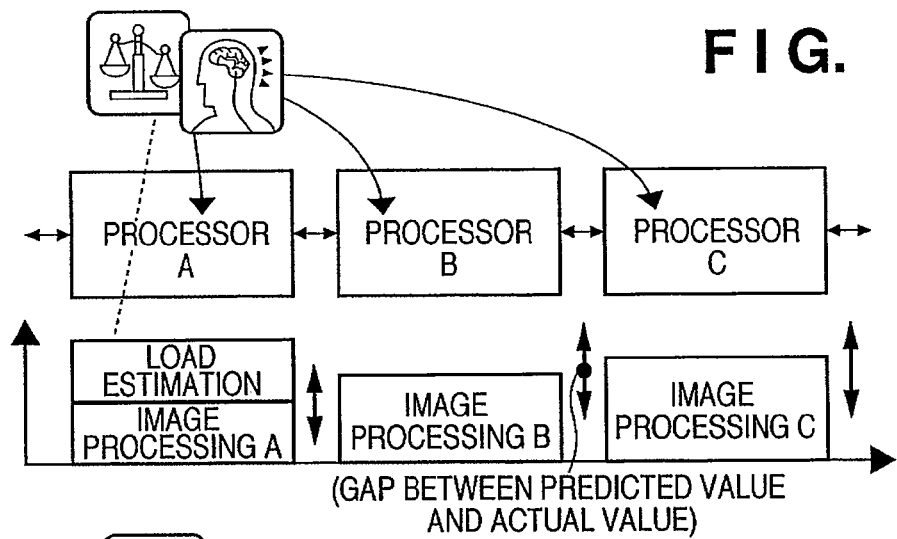
FIGS. 13A to 13C are conceptual diagrams showing the system process load (load estimation) in the conventional system.
Figure 13B:
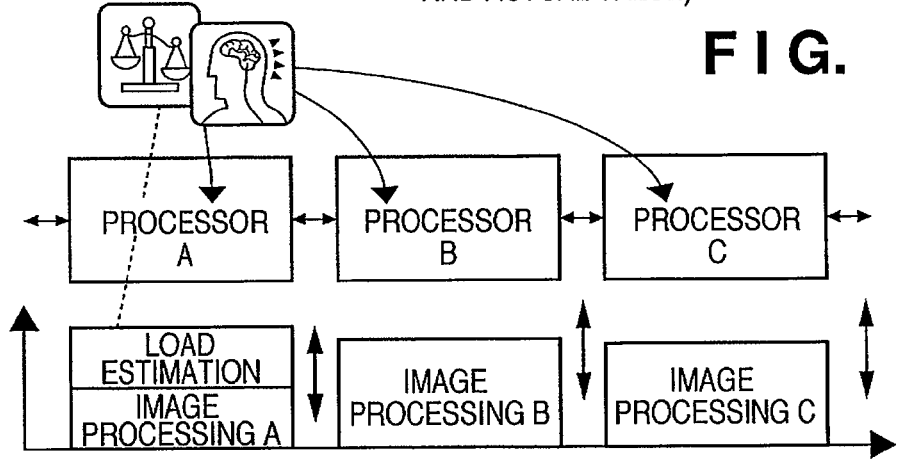
Figure 13C:
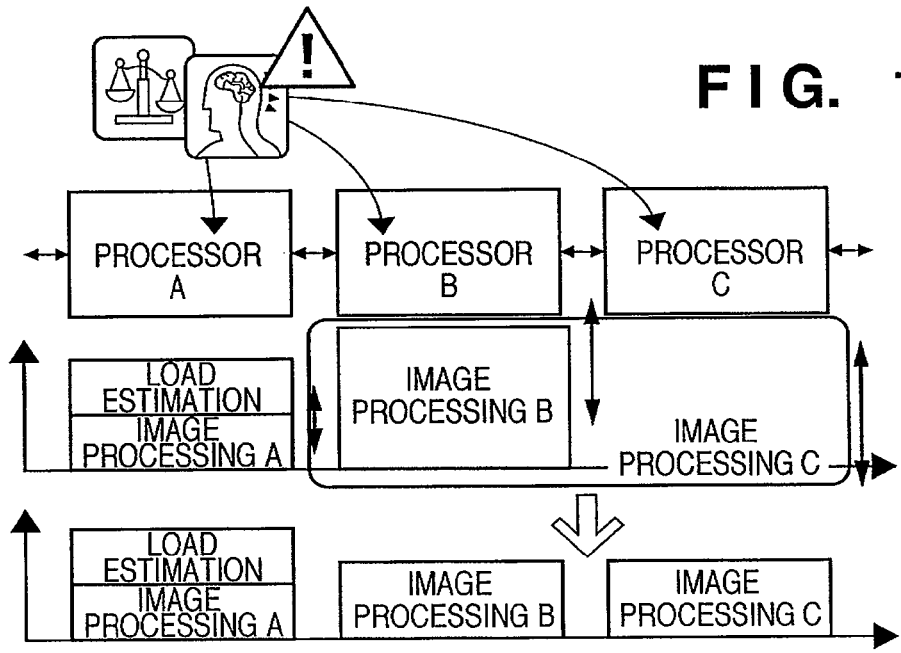

As shown in FIGS. 13A and 13B, in the conventional art, the processor A, for example, performs a load estimation task to periodically estimate the loads of all the processors A to C in addition to the image processing task assigned to the processor A. As a result of the load estimation, as shown in FIG.

13C, if load off-balance between the processors B and C is determined, queuing of the image processing assigned to the processors B and C is performed. Then, at certain timing, the processor A performs reassignment of the image processing to the processors B and C.

However, in PDL command processing such as edge processing, level processing and color composition processing, the load of image processing is not always proportional to the amount of PDL data. Further, as the load greatly varies by page or by band, the precision of load estimation is easily degraded. Accordingly, there is a probability that the load balancing is performed in accordance with load estimation with low precision and unnecessary load balancing is repeated. Further, in order to raise the precision of load estimation, the load for the load estimation is increased.

Figure 14A:
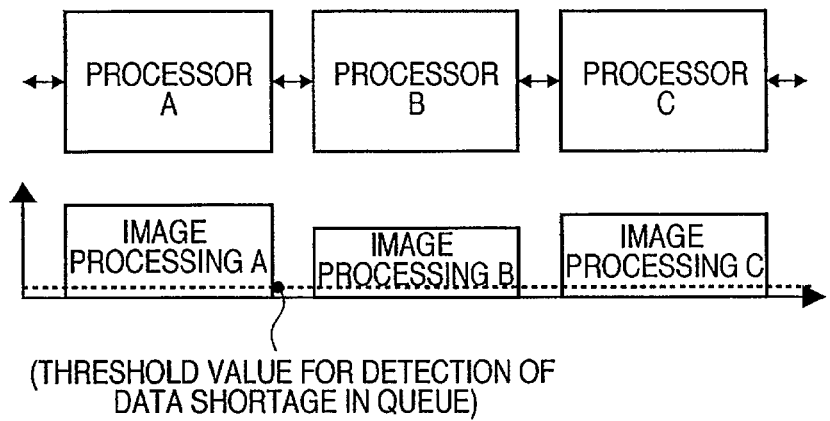
FIGS. 14A to 14C are conceptual diagrams showing the system process load (load estimation) in the system according to the embodiment.
Figure 14B:
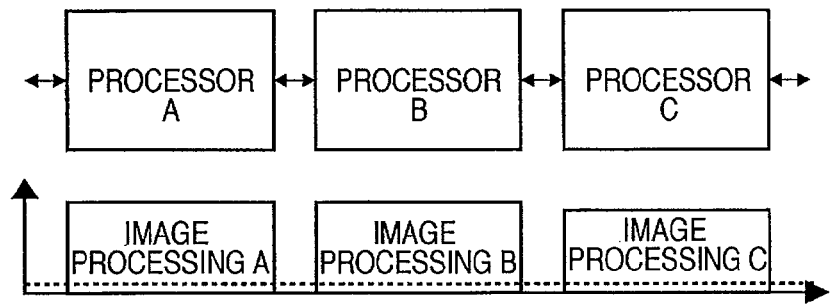
Figure 14C:
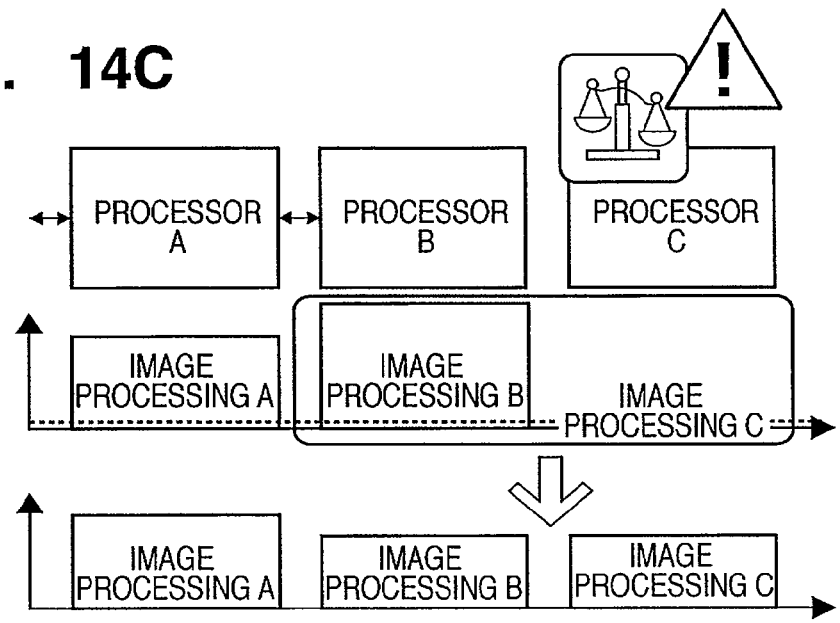

On the other hand, in the present embodiment, as shown in FIGS. 14A and 14B, unless extreme load off-balance is occurred, all the processors A to C including the processor A perform image processing assigned to the respective processors. Further, each processor detects its own waiting state by referring to adjacent queues. Then, as shown in FIG. 14C, the processor C, for example, in the process waiting state, utilizes its waiting time to issue a processing request to the processor B and perform a part of the processing for the processor B.

Finally, in a generally-designed system, image processings are assigned to respective processors in consideration of load balance such that the load balance is uniform with respect to average data.

According to the present embodiment, excessive process load for load balancing does not occur in comparison with the conventional art. Further, even when load off-balance is determined, preferable load balancing is performed, thereby degradation of throughput of the entire system can be prevented.

Other Embodiments

The present invention can also be achieved by directly or remotely supplying a software program that realizes the functionality of the abovementioned embodiment to a system or device, whereupon a computer in the system or device reads out and executes the supplied program. In such a case, the format does not necessarily need to be a program, as long as it has the functionality of a program.

Accordingly, the program code itself, installed in a computer so as to realize the functional processing of the present invention through a computer, also realizes the present invention. In other words, the computer program itself, for realizing the functional processing of the present invention, is also included within the scope of the claims of the present invention. In this case, a program may be in any form, and object code, a program executed through an interpreter, script data supplied to an OS, or the like may be used, as long as it has the functionality of the program.

Various storage media can be used for supplying the program. Examples thereof include a Floppy® disk, a hard disk, an optical disk, a magneto-optical disk, an MO, a CD-ROM, a CD-R, a CD-RW, magnetic tape, a non-volatile memory card, a ROM, a DVD (DVD-ROM, DVD-R), and so on.

Alternatively, using a browser of a client computer to connect to an Internet homepage and downloading the computer program of the present invention to a storage medium such as a hard disk can be given as another method for supplying the program. In this case, the downloaded item may be the computer program of the present invention itself or a compressed file including a function for automatic installation. Furthermore, this method may be realized by dividing the program code that makes up the program of the present invention into a plurality of files and downloading each file from different homepages. In other words, a WWW server that allows a plurality of users to download the program files for realizing the functional processing of the present invention through a computer is also included within the scope of the claims of the present invention.

In addition, the program of the present invention may be encrypted, stored in a storage medium such as a CD-ROM or the like, and distributed to a user. In this case, a user that has cleared a predetermined condition is allowed to download key information for removing the cryptography from a homepage via the Internet, use the key information to decrypt the program into an executable format, and install the program on a computer.

In addition to a computer realizing the functionality of the aforementioned embodiments by executing a read-out program, the functionality of the embodiments may be realized through another form. For example, an OS or the like running on the computer can perform part or all of the actual processing based on instructions from the program, and the functionality of the aforementioned embodiments can be realized through this processing.

Furthermore, the program read out from the storage medium may be written into a memory provided in a function expansion board installed in the computer or a function expansion unit connected to the computer. In this case, after the program has been written into the function expansion board, function expansion unit, or the like, a CPU or the like provided in the function expansion board, function expansion unit, or the like executes part or all of the actual processing based on instructions of the program, and the functionality of the aforementioned embodiments can be realized through this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-117560, filed Apr. 26, 2007, which is hereby incorporated by reference herein in its entirety.

What is claimed is:

1. An image processing apparatus comprising:
a first processor and a second processor continuously performing plural types of image processing on data,
wherein the first processor comprises:
a determination unit configured to detect at least one of a storage state of a first data storage unit to store data to be processed by the first processor and a storage state of a second data storage unit to store data processed by the first processor and determine whether or not the first processor is in a waiting state;
a mode switching unit configured to switch an operation mode of the first processor between a normal mode to perform a type of image processing assigned to the first processor and an auxiliary mode to perform a type of image processing assigned to the second processor, in accordance with the result of determination by the determination unit; and
a process request unit configured to, in a case that the operation mode of the first processor is switched by the mode switching unit to the auxiliary mode to assist the second processor, issue a request for execution of the type of image processing assigned to the second processor to the second processor, wherein the second processor comprises:
  a notification unit configured to, in response to the request from the first processor by the process request unit, notify information specifying data, which is stored in a third data storage unit and is to be processed by the first processor, to the first processor,
  further wherein the first processor reads the data which is stored in the third data storage unit and specified by the information notified by the notification unit and performs the type of image processing, assigned to the second processor, on the data.

2. An apparatus according to claim 1, wherein the determination unit determines whether or not the first processor is in the waiting state based on whether the first data storage unit is empty and whether the second data storage unit is full,
  and wherein in a case that the second data storage unit is full or the first data storage unit is empty, the mode switching unit switches the first processor from the normal mode to the auxiliary mode.

3. An apparatus according to claim 1, wherein the determination unit determines whether or not the first processor is in the waiting state based on whether or not an amount of data stored in the first data storage unit and an amount of data stored in the second data storage unit are greater than a predetermined threshold value,
  and wherein in a case the amount of data stored in the second data storage unit is greater than the threshold value or the amount of data stored in the first data storage unit is not greater than the threshold value, the mode switching unit switches the first processor from the normal mode to the auxiliary mode.

4. An apparatus according to claim 1, wherein after the first processor has performed the type of image processing assigned to the second processor, the determination unit again detects at least one of a storage state of the first data storage unit and a storage state of the second data storage unit and determines whether or not the first processor is in the waiting state,
  and wherein, in a case that it is determined by the determination unit that the first processor is not in the waiting state, the first processor performs the type of image processing assigned to the first processor.

5. An apparatus according to claim 4, wherein the determination unit determines whether or not the first processor is in the waiting state based on whether the first data storage unit is empty and whether the second data storage unit is full,
  and wherein in a case that the second data storage unit is not full and the first data storage unit is not empty, the mode switching unit switches the first processor from the auxiliary mode to the normal mode.

6. An apparatus according to claim 4, wherein the determination unit determines whether or not the first processor is in the waiting state based on whether or not an amount of data stored in the first data storage unit and an amount of data stored in the second data storage unit are greater than a predetermined threshold value,
  and wherein in a case that the amount of data stored in the second data storage unit is not greater than the threshold value and the amount of data stored in the first data storage unit is greater than the threshold value, the mode switching unit switches the first processor from the auxiliary mode to the normal mode.

7. An image processing method for an image processing apparatus having plural processors for continuously performing plural types of image processing on data, comprising:
  a determination step of detecting at least one of a storage state of a first data storage unit to store data to be processed by a first processor included in the plural processors and a storage state of a second data storage unit to store processed data by the first processor and determining whether or not the first processor is in a waiting state;
  a mode switching step of switching an operation mode of the first processor between a normal mode to perform a type of image processing assigned to the first processor and an auxiliary mode to perform a type of image processing assigned to a second processor included in the plural processors, in accordance with the result of determination in the determination step; and
  a process request step of, in a case that the operation mode of the first processor is switched in the mode switching step to the auxiliary mode to assist the second processor, issuing a request for execution of the type of image processing assigned to the second processor to the second processor;
  a notification step of, in response to the request, issued in the process request step, from the first processor, notifying information specifying data, which is stored in a third data storage unit and is to be processed by the first processor, to the first processor; and
  an auxiliary step of, at the first processor, reading the data which is stored in the third data storage unit and specified by the information notified in the notification step, and performing the type of image processing, assigned to the second processor, on the data.

8. A method according to claim 7, wherein in the determination step, it is determined whether or not the first processor is in the waiting state based on whether the first data storage unit is empty and whether the second data storage unit is full,
  and wherein in a case that the second data storage unit is full or the first data storage unit is empty, the first processor is switched from the normal mode to the auxiliary mode in the mode switching step.

9. A method according to claim 7, wherein in the determination step, it is determined whether or not the first processor is in the waiting state based on whether or not an amount of data stored in the first data storage unit and an amount of data stored in the second data storage unit are greater than a predetermined threshold value,
  and wherein in a case that the amount of data stored in the second data storage unit is greater than the threshold value or the amount of data stored in the first data storage unit is not greater than the threshold value, the first processor is switched from the normal mode to the auxiliary mode in the mode switching step.

10. A method according to claim 7, wherein after the first processor has performed the type of image processing assigned to the second processor, in the determination step, again at least one of a storage state of the first data storage unit and a storage state of the second data storage unit are detected and it is determined whether or not the first processor is in the waiting state,
  and wherein, in a case that it is determined in the determination step that the first is not in the waiting state, the first processor performs the type of image processing assigned to the first processor.

11. A method according to claim 10, wherein in the determination step, it is determined whether or not the first processor is in the waiting state based on whether the first data storage unit is empty and whether the second data storage unit is full,
  and wherein in a case that the second data storage unit is not full and the first data storage unit is not empty, the first processor is switched from the auxiliary mode to the normal mode in the mode switching step.

12. A method according to claim 10, wherein in the determination step, it is determined whether or not the first processor is in the waiting state based on whether or not an amount of data stored in the first data storage unit and an amount of data stored in the second data storage unit are greater than a predetermined threshold value, and wherein in a case that the amount of data stored in the second data storage unit is not greater than the threshold value and the amount of data stored in the first data storage unit is greater than the threshold value, the first processor is switched from the auxiliary mode to the normal mode in the mode switching step.

13. An image processing apparatus comprising: a first processor configured to perform a first type of image processing on data; and a second processor configured to perform a second type of image processing on data stored in a storage unit, wherein the first processor comprises: a determination unit configured to determine whether to assist the second processor; a process request unit configured to, in a case that it is determined to assist the second processor, issue a request for execution of the second type of image processing to the second processor, wherein the second processor comprises: a notification unit configured to, in response to the request by the process request unit, notify information specifying data, which is stored in the storage unit, and is to be processed by the first processor, to the first processor, and wherein the first processor reads the data which is stored in the data storage unit and specified by the information notified by the notification unit, and performs the second type of image processing on the data.

* * * * *